United States Patent [19]

Craft

[11] Patent Number: 4,995,768
[45] Date of Patent: Feb. 26, 1991

[54] RAPID CHANGE DRILL HOLDER ASSEMBLY

[76] Inventor: Ralph Craft, 7221 Five Point Hwy., Easton Rapids, Mich. 48827

[21] Appl. No.: 387,005

[22] Filed: Jul. 31, 1989

[51] Int. Cl.⁵ .............................................. B23B 51/12
[52] U.S. Cl. ............................... 408/239 A; 279/1 A; 279/83; 279/1 M
[58] Field of Search .............. 279/1 E, 89, 104, 97, 279/86, 83, 1 A, 1 B, 1 M, 93; 82/160; 408/239 P, 237 A, 141; 409/239; 403/306, 348, 361, 439; 81/177, 85, 125, 124.7, 408

[56] References Cited

U.S. PATENT DOCUMENTS

| Re.24,066 | 10/1955 | Brown | 279/1 M |
|---|---|---|---|
| 366,826 | 7/1887 | Gavin et al. | 279/93 |
| 1,054,126 | 2/1913 | Lindberg | 279/75 |
| 1,091,263 | 3/1914 | Waugsh | 279/76 X |
| 1,253,511 | 1/1918 | Moler | 403/330 |
| 1,353,299 | 9/1920 | Wilson | 279/75 |
| 1,695,564 | 12/1928 | Thomas | 279/89 |
| 1,766,136 | 6/1930 | Markstrum | 279/93 |
| 1,954,048 | 4/1934 | Jeffrey et al. | 279/78 |
| 2,157,153 | 5/1939 | Troche | 254/150 |
| 2,328,988 | 9/1943 | Martin | 287/113 |
| 2,337,402 | 12/1943 | Mills | 279/83 |
| 2,726,091 | 12/1955 | Topar | 279/93 |
| 2,773,693 | 12/1956 | Chittendeon | 279/97 |
| 3,575,419 | 4/1971 | Davis | 273/186 |
| 3,858,910 | 1/1975 | Oetiker | 285/84 |
| 3,929,343 | 12/1975 | Wanner et al. | 279/1 B |
| 3,945,744 | 3/1976 | Metz | 403/317 |
| 4,474,488 | 10/1984 | Pinkerton et al. | 403/24 |
| 4,512,692 | 4/1985 | Nielsen | 408/226 |
| 4,615,402 | 10/1986 | Eisenloeffel | 175/320 |
| 4,655,631 | 4/1987 | Mitchell | 403/349 |
| 4,784,543 | 11/1988 | Mitchell et al. | 409/234 |

FOREIGN PATENT DOCUMENTS 949316 8/1956 Fed. Rep. of Germany ..... 279/1 M

Primary Examiner—Zenon Bilinsky
Assistant Examiner—Robert Schultz
Attorney, Agent, or Firm—Miller, Morriss and Pappas

[57] ABSTRACT

A rapid change drill holder assembly consisting of a chuck-engaging adaptor holder for selective fixed engagement with a power tool chuck and a tool holder adaptor for selective operative engagement with the chuck-engaging adaptor holder so as to permit selective changing of tools fixedly mounted in the tool holder adaptor without the necessity of removing the chuck-engaging adaptor holder from the power tool chuck each time a tool change is required.

4 Claims, 3 Drawing Sheets

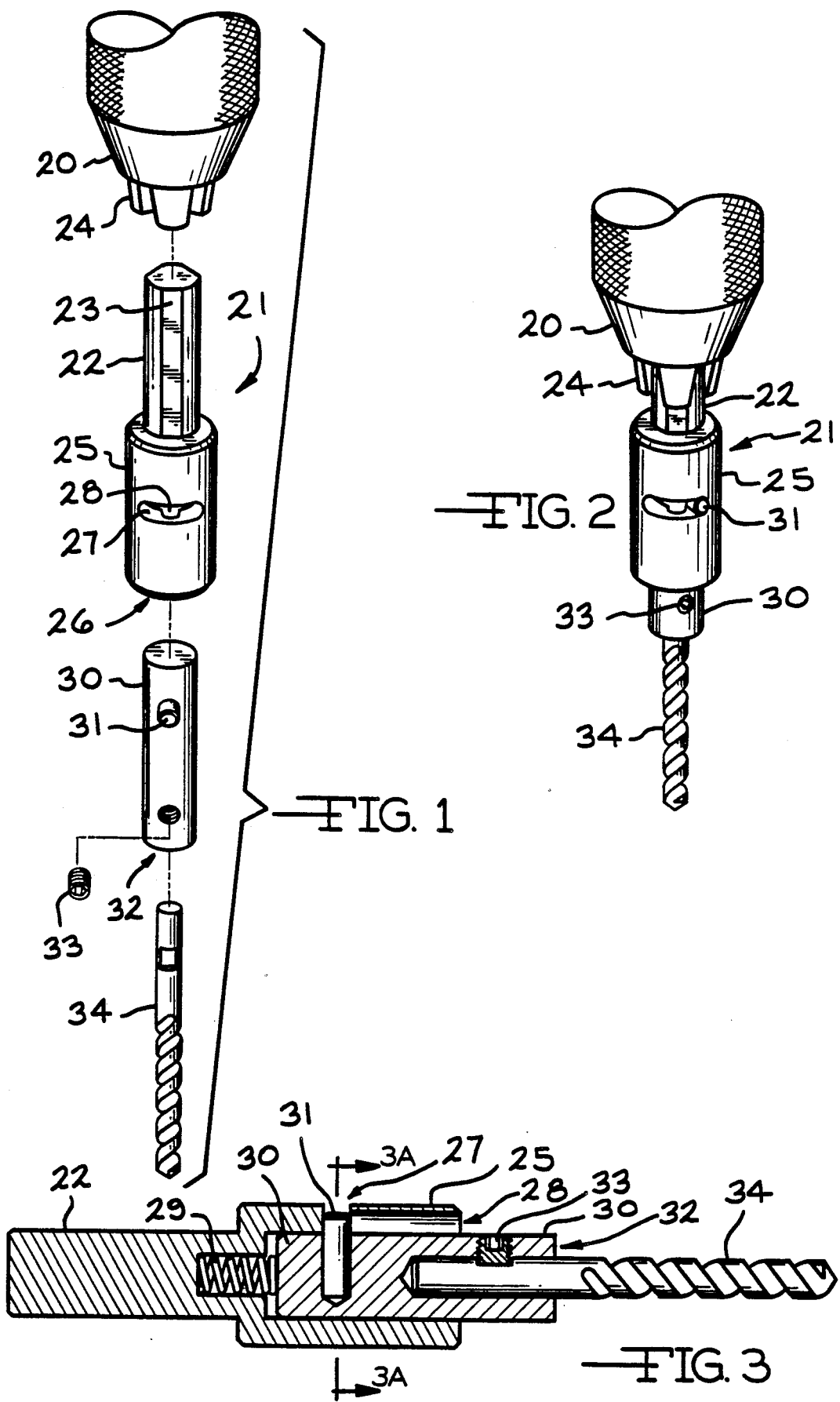

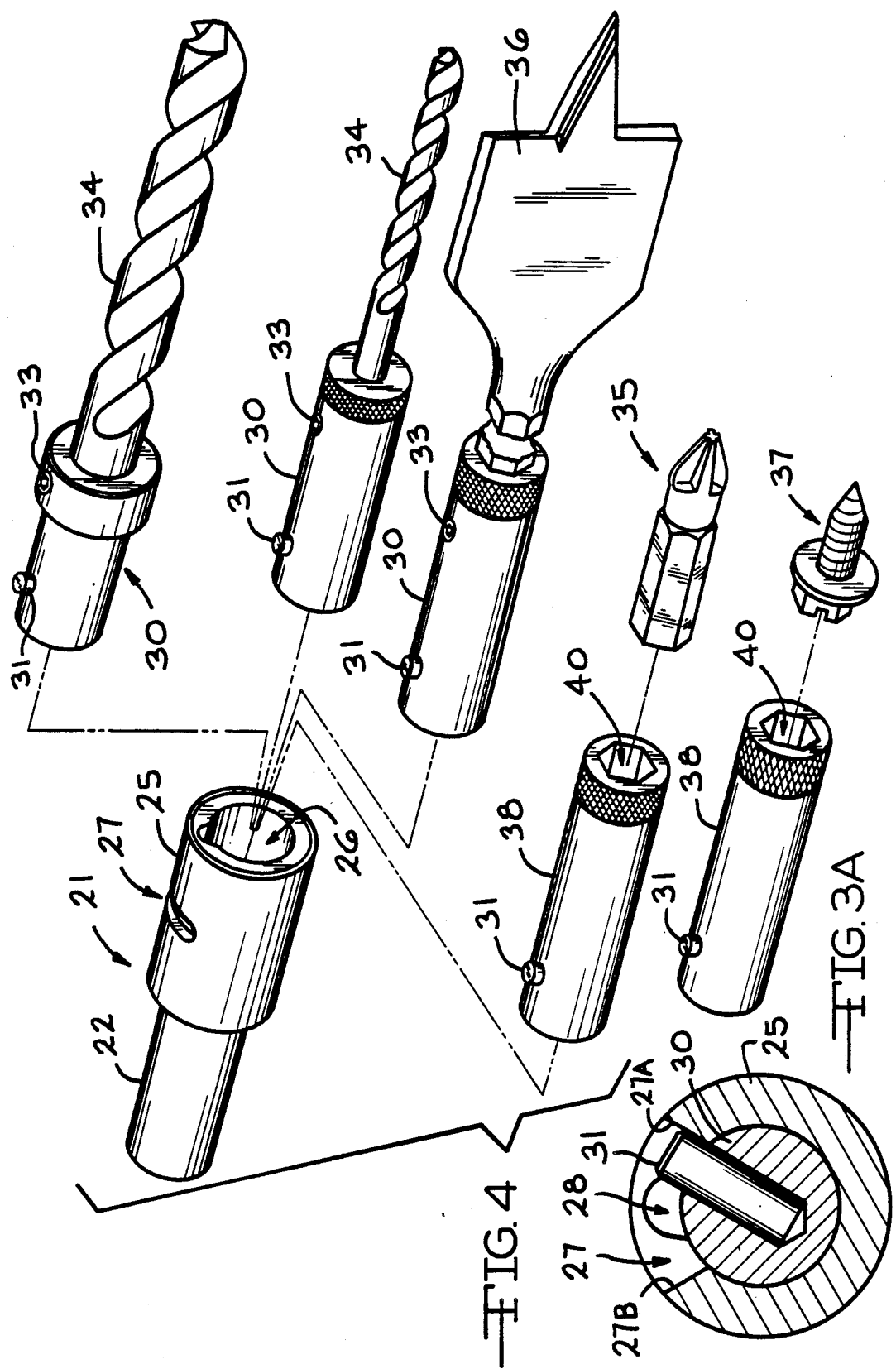

RAPID CHANGE DRILL HOLDER ASSEMBLY

This invention relates to a rapid change drill holder assembly which permits the user to selectively change drills, screwdriver bits and the like without removing the chuck-engaging adaptor holder from the power hand drill and/or drill press chuck. More particularly, the rapid drill holder assembly comprises a chuck-engaging adaptor holder and a tool holder adaptor member adapted for selective operative locking engagement with the chuck-engaging adaptor holder member so as to permit selective rapid engagement and disengagement from the chuck-engaging adaptor holder member without the necessity of removing the chuck-engaging adaptor holder member from the drill chuck.

It is thus seen that a rapid change drill holder assembly is provided which utilizes a tool holder adaptor member which permits the user to rapidly selectively change his drill or other tool mounted therein as desired without having to undertake time-consuming removal of the standard tool from the chuck of such devices as portable power hand drills, drill presses, lathes and the like, as has been the practice in the prior known art.

In use, the carpenter or other user selectively mounts a variety of various size drills, screwdriver bits, sheet metal screws, chamfering tools, paddle bores and the like in their respective tool holder adaptor member for use as required. Thus mounted, the various tools are readily available to the user as the needs of the particular job require. It is readily seen that the use of the tool holder adaptor member permits the user to rapidly change from one tool to another without having to make time consuming use of a chuck key every time a tool change is required. This capability not only saves time on the job but avoids wear and tear on the chuck itself while avoiding the possibility of the chuck becoming out of adjustment due to repeated use. The availability of this invention in the trade will be especially appreciated by carpenters who do wood trimming work in the carpentry trade and by sheet metal forming workers.

Nowhere in the prior known art is there shown a rapid change tool holder assembly such as the claimed structure of applicant wherein a chuck-engaging adaptor holder is provided for selective engagement with a tool holder adaptor member having a tool mounted therein.

Further, nowhere in the prior known art is there shown a tool holder adaptor member having a drill or other tool fixedly mounted therein and wherein the tool holder adaptor is adapted for selective rapid engagement and dis-engagement with a chuck-engaging adaptor holder mounted in the chuck of such devices as power hand drills, drill presses, lathes and the like, so as to permit the user to rapidly change tools without the time-consuming necessity of removing the tool from the chuck every time a tool change is required.

A need has therefore existed for a rapid change drill holder assembly whereby the user may rapidly change a tool without having to repeatedly open and close the chuck of the machine tool every time a tool change is required.

It is therefore an object of this invention to provide a rapid change drill holder assembly wherein a too adaptor member is provided for fixedly engaging a specific tool, such as a drill, screwdriver bit and which is adapted for selectively rapid engagement and disengagement with a chuck-engaging adaptor holder mounted in the chuck of a power hand drill, drill press, lathe and the like, every time a tool change is required without the necessity of repeatedly opening and closing the chuck at each tool change.

Other objects and advantages found in the construction of the invention will be apparent from a consideration of the following specification in connection with the appended claims and the accompanying drawings.

IN THE DRAWINGS

FIG. 1 is an exploded perspective view of the rapid change drill holder assembly showing a chuck, the chuck-engaging adaptor holder, the tool holder adaptor member and a drill tool selectively used in association therewith.

FIG. 2 is a perspective view of the rapid change drill holder assembly in its assembly use position.

FIG. 3 is a schematic sectional view showing the tool holder adaptor in operative locked engagement with the chuck-engaging adaptor holder.

FIG. 3A is a sectional view taken on line 3A—3A of FIG. 3.

FIG. 4 is an exploded perspective view of the chuck-engaging adaptor holder with various tools mounted on their respective tool holder adaptor member for selective operative engagement with the chuck-engaging adaptor holder.

DESCRIPTION

Figure 5:
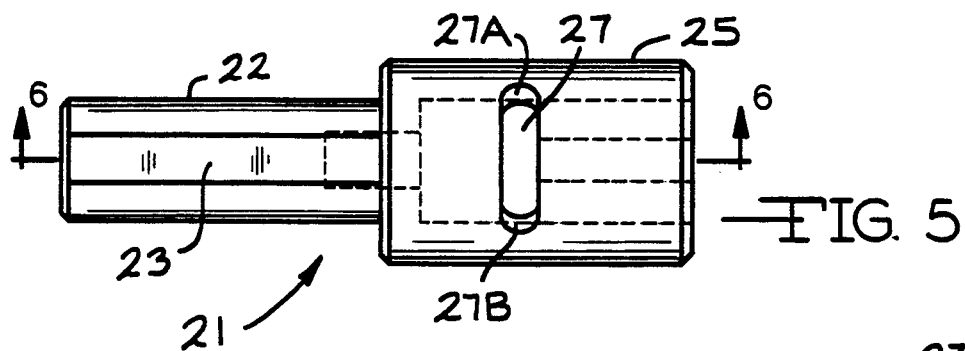
FIG. 5 is a top schematic view of the chuck-engaging adaptor holder with the transversely oriented tool holder adaptor peg receiving slot provided therein.
Figure 6:
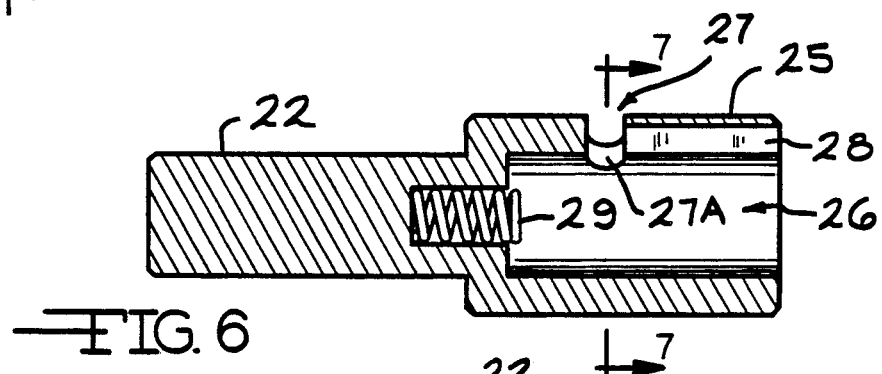
FIG. 6 is a sectional view taken on line 6—6 of FIG. 5.
Figure 7:
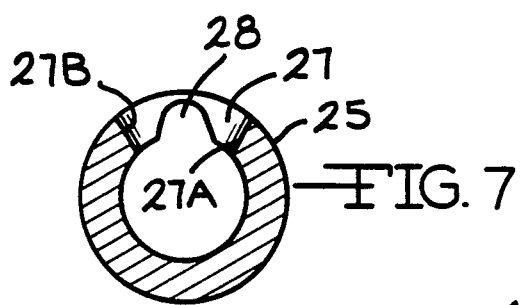
FIG. 7 is a sectional view taken on line 7—7 of FIG. 6.

A standard tool holder chuck 20, as provided on power hand drills, drill presses, lathes and the like, is partially shown in the exploded schematic view of FIG. 1 but does not constitute a part of the invention. As shown generally in the drawings, a chuck-engaging adaptor holder 21 is provided having a chuck-engaging extension 22 at one end thereof which is provided with longitudinal flat portions 23 to facilitate engagement with the jaws 24 of the chuck 20. The chuck-engaging adaptor holder 21 is provided with a tool holder adaptor receiving portion 25 at the opposite end thereof. The tool holder adaptor receiving portion 25 has a tool holder adaptor receiving bore 26 longitudinally provided at one end thereof. A transversely oriented tool holder adaptor peg receiving slot 27 is provided through the wall of the tool holder adaptor receiving portion 25 so as to be in open communication with said bore 26. A tool holder adaptor peg receiving groove 28 is longitudinally provided in the wall of the bore 26 beginning at the open end thereof and extending thereinto so as to be in open communication with the transversely oriented peg receiving arcuate slot 27. A tool holder adaptor engaging spring 29 is provided at the base of the tool adaptor receiving bore 26 so as to make spring biased engagement with the end of the tool holder adaptor 30 selectively positioned therein.

As shown in FIGS. 1 through 4, the tool holder adaptor 30 is provided with a cam follower peg 31 radially extending outwardly from the side thereof. The cam follower peg 31 is positioned proximate to the end of the tool holder adaptor 30 which is selectively inserted into the bore 26 of the chuck-engaging adaptor holder 21 until it engages the spring 29. As the tool holder adaptor 30 is fully inserted into the bore 26 of the chuck-engaging adaptor holder 21, the peg 31 passes through the longitudinal peg receiving groove 28 provided along the bore 26 into orientation with the arcuate slot 27. As shown in FIG. 3A, the tool holder adaptor 30 is then twisted so that the peg 31 moves along the arcuate slot 27 into driving engagement with the end wall 27A thereof. In this position, the peg 31 is moved in response to the forward or insertion operation of the drive unit, i.e. power tool, drill press, lathe and the like, upon which the rapid change drill assembly is mounted. When the drive unit is in its reverse or withdraw operation, the peg 31 moves along the arcuate slot 27 into driving engagement with the opposite end 27B of the slot 27 so as to effect easy withdrawal of the drill or other tool from the work product. In these positions, the base of the tool holder adaptor 30 is in biased contact with the spring 29. The biasing action of the spring 29 thus acts to retain the tool holder adaptor 30 in its operative use position within the chuck-engaging adaptor holder 21.

The peg-slot configuration thus permits the operative engagement of the tool holder adaptor 30 within the chuck-engaging adaptor holder during both the forward and reverse operation of the drive unit.

As shown in FIGS. 1 through 4, the tool holder adaptor 30 is provided with a tool receiving bore 32 at the opposite end thereof. A radially oriented tool-receiving set-screw 33 is provided through the wall of the tool holder adaptor 30 so as to fixedly and retentively engage the side of a drill tool 34 inserted therein.

As shown in FIG. 4, a variety of tools, such as various sizes of drills 34, screwdriver bits 35, paddle bores 36, sheet metal screws 37 and the like, are fixedly inserted into their respective tool holder adaptor 30 and are carried by the user for selective use as required. When a specific tool change is needed, the user merely removes the tool being used from the chuck engaging adaptor holder 21 by twisting the tool holder adaptor 30 so that the peg 31 thereof moves into alignment with the longitudinal groove 28 and the tool holder adaptor 30 is pulled out of the chuck-engaging adaptor holder 21. The new tool is quickly installed into chuck-engaging adaptor holder 21 by inserting its respective tool holder adaptor 30 into its operative use position within the chuck-engaging adaptor holder 21 as previously described. Thus, while a variety of tools are used, the chuck-engaging adaptor holder 21 never has to be disengaged from its permanent use position within the chuck 24. This saves time as well as prevents wear and tear on the chuck and also prevents misalignment thereof brought about by repeated opening and closing thereof in order to effect tool changes as is required in the prior art devices.

Figure 8:
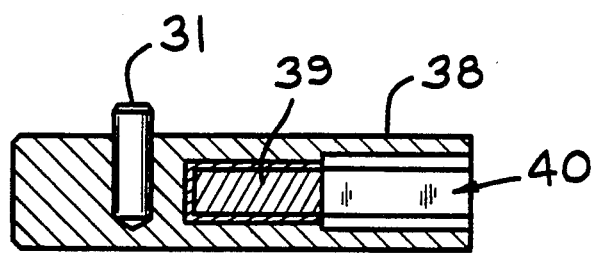
FIG. 8 is a schematic sectional view of a modified embodiment of the tool holder adaptor with a tool-engaging magnet positioned therein.
Figure 9:
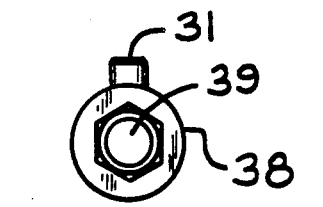
FIG. 9 is a schematic right end view of the modified embodiment of the tool holder adaptor shown in FIG. 8.

Another embodiment of the tool holder adaptor 38 is shown in FIGS. 8 and 9. A tool retaining magnet 39 is provided at the base of the tool receiving bore 40. The bore 40 is hexagonally sided so as to matingly receive the corresponding hexagonally sided tool as shown in FIG. 4. The use of the magnet 39 eliminates the need for the use of a tool-engaging set screw 33 in this particular embodiment.

Figure 10:
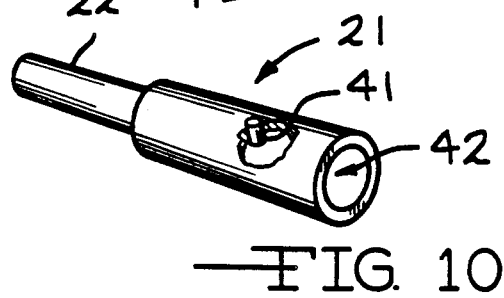
FIG. 10 is a schematic perspective view of a modified embodiment of the chuck-engaging adaptor holder showing an internal cam follower peg positioned therein.
Figure 11:
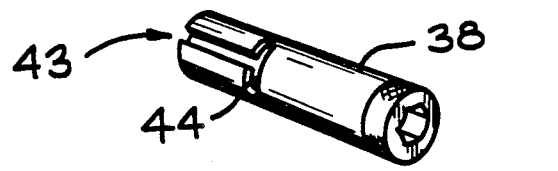
FIG. 11 is a schematic perspective view of a modified embodiment of the tool holder adaptor having a T-slot for selective locking engagement, with the peg of the modified chuck-engaging adaptor holder shown in FIG. 10.

As shown in FIGS. 10 and 11, it is within the scope of the invention to reverse the cam and cam follower peg and slot arrangement previously shown and described herein by placing an inwardly extending peg 41 within the bore 42 of the chuck-engaging adaptor holder 21 so as to matingly engage a corresponding peg receiving T-slot 43 having a transverse peg portion 44 provided in the outer surface of the tool holder adaptor 38 at one end thereof. This modification would also apply to the tool holder adaptor 30.

It should be noted that all of the components of the rapid change drill holder assembly may be fabricated from steel, stainless steel or surgical steel for use in environments such as hospitals and/or space technology applications where corosion-free materials are required.

It is thus seen that a rapid change drill holder assembly is provided that consists of a chuck-engaging adaptor holder which has a longitudinally extending chuck-engaging extension provided at one end thereof. The chuck-engaging adaptor holder is provided with a tool holder adaptor receiving portion at the opposite end thereof. The tool holder adaptor receiving portion has a tool holder adaptor receiving bore longitudinally provided therein. The tool holder adaptor receiving bore is provided with a tool holder adaptor engaging biasing spring at the inside terminal end thereof. A transversely oriented tool holder adaptor peg receiving arcuate slot is defined in the wall of the tool holder adaptor receiving portion. The arcuate slot is in open communication with the tool holder adaptor receiving bore. The arcuate slot has a tool holder adaptor peg engaging end wall provided at each end thereof. A longitudinally extending tool holder adaptor peg receiving groove is defined in the wall of the bore so as to extend from the open end of the bore into open communication with the arcuate slot. A tool holder adaptor is provided for selective operative engagement with the chuck-engaging adaptor holder. The tool holder adaptor has a tool receiving bore at one end thereof for selectively receiving a tool therein. The tool holder adaptor is provided with a radially oriented tool-retaining set-screw for fixedly retaining a tool selectively positioned in the tool receiving bore. The tool holder adaptor has a cam follower peg radially extending outwardly from the side thereof. The cam follower peg is adapted for selective movement through the tool holder adaptor peg receiving groove into operative alignment with the transversely oriented arcuate slot upon selective insertion of the tool holder adaptor into the tool holder adaptor receiving bore of the chuck-engaging adaptor holder. The tool holder adaptor is selectively twistable so as to selectively move the cam follower peg into selective operative engagement with a selected end wall of the arcuate slot. The tool holder adaptor is in selective biased engagement with the biasing spring so as to maintain the peg in its operative use engagement with the arcuate slot.

Another embodiment of the rapid change drill holder assembly is provided wherein the tool receiving bore of the tool holder adaptor is modified to have a tool retaining magnet provided at the inside terminal end of the tool receiving bore. The tool retaining magnet is adapted to magnetically retain a tool positioned thereagainst within the tool receiving bore. The tool receiving bore is provided with hexagonal internal longitudinally extending sides so as to matingly operatively engage a hexagonal sided tool selectively inserted within the tool receiving bore.

In yet another embodiment of the rapid change drill holder assembly, a chuck-engaging adaptor holder is provided having a longitudinally extending chuck-engaging extension provided at one end thereof. The chuck-engaging adaptor holder is provided with a tool holder adaptor receiving portion at the opposite end thereof. The tool holder adaptor receiving portion has a tool holder adaptor receiving bore longitudinally provided therein. The tool holder adaptor receiving bore is provided with a tool holder adaptor engaging biasing spring at the inside terminal end thereof. The tool holder adaptor receiving bore is provided with a cam follower peg extending radially inwardly from the inside wall thereof. A tool holder adaptor is provided for selective operative engagement with the chuck-engaging adaptor holder. The tool holder adaptor has a tool receiving bore at one end thereof for selectively receiving a tool therein. The tool holder adaptor is provided with a radially oriented tool-retaining set-screw for fixedly retaining a tool selectively positioned in the tool receiving bore. The tool holder adaptor has a peg-receiving T-slot in the outer surface at one end thereof. The peg receiving T-slot has a transverse arcuate portion. The T-slot is adapted to operatively engage the cam follower peg upon selective insertion of the tool holder adaptor into the tool holder adaptor receiving bore of the chuck-engaging adaptor holder. The tool holder adaptor is selectively twistable so as to selectively move the cam follower peg into selective operative engagement with a selected end wall of the arcuate portion of the T-slot. The tool holder adaptor is in selective biased engagement with the biasing spring so as to maintain the peg in its operative use engagement with the arcuate portion of the T-slot. This embodiment of the invention may also be provided with a modified embodiment of the tool holder adaptor wherein the tool receiving bore of the tool holer adaptor is modified to have a tool retaining magnet provided at the inside terminal end of the tool receiving bore. The tool retaining magnet is adapted to magnetically retain a tool positioned thereagainst within the tool receiving bore. The tool receiving bore is provided with hexagonal internal longitudinally extending sides so as to matingly operatively engage a hexagonal sided tool selectively inserted within the tool receiving bore.

Various other modifications of the invention may be made without departing from the principle thereof. Each of the modifications is to be considered as included in the hereinafter appended claims, unless these claims by their language expressly provide otherwise.

I claim:

1. In a rapid change drill holder assembly, the combination comprising:

a chuck-engaging adaptor holder having a longitudinally extending chuck-engaging extension provided at one end thereof, said chuck-engaging adaptor holder having a tool holder adaptor receiving portion at the opposite end thereof, said tool holder adaptor receiving portion having an axially extending tool holder adaptor receiving bore longitudinally provided therein, said tool holder adaptor receiving bore provided with a tool holder adaptor engaging biasing spring at the inside terminal end thereof;

a transversely oriented tool holder adaptor peg receiving arcuate slot defined in the wall of said tool holder adaptor receiving portion, said arcuate slot being in open communication with said tool holder adaptor receiving bore, said arcuate slot having a tool holder adaptor peg engaging end wall provided at each end thereof;

a longitudinally extending tool holder adaptor peg receiving groove defined int he wall of said bore so as to extend from the open end of said bore into open communication with said arcuate slot, said peg receiving groove being in open communication with said arcuate slot at a point intermediate the distal ends of said arcuate slot;

a tool holder adaptor for selective operative engagement with said chuck-engaging adaptor holder, said tool holder adaptor having a tool receiving bore at one end thereof for selectively receiving a tool therein, said tool holder adaptor provided with a radially oriented tool-retaining set-screw for fixedly retaining a tool selectively positioned in said tool receiving bore, said tool holder adaptor having a cam follower peg radially extending outwardly from the side thereof, said cam follower peg adapted for selective movement through said tool holder adaptor peg receiving groove into operative alignment with said transversely oriented arcuate slot upon selective insertion of said tool holder adaptor into said tool holder adaptor receiving bore of said chuck-engaging adaptor holder, said tool holder adaptor selectively twisting so as to selectively move said cam follower peg into selective operative engagement with a selected distal end wall of said arcuate slot, said tool holder adaptor in selective biased engagement with said biasing spring so as to maintain said peg in its operative use engagement with said arcuate slot.

2. In the rapid change drill holder assembly of claim 1 wherein a further modified tool holder adaptor is provided for alternative selective operative engagement with said chuck-engaging adaptor holder, said modified tool holder adaptor having a tool receiving bore at one end thereof for selectively receiving a tool therein, said tool receiving bore having a tool retaining magnet provided at the inside terminal end of said tool receiving bore, said tool retaining magnet adapted to magnetically retain a tool positioned thereagainst within said tool receiving bore, said tool receiving bore provided with hexagonal internal longitudinal extending sides so as to matingly operatively engage a hexagonal sided tool selectively inserted with said tool receiving bore, said modified tool holder adaptor having a cam follower peg radially extending outwardly from the side thereof, said cam follower peg adapted for selective movement through said tool holder adaptor peg receiving groove into operative alignment with said transversely oriented arcuate slot upon selective insertion of said modified tool holder adaptor into said tool holder adaptor receiving bore of said chuck-engaging adaptor holder, said modified tool holder adaptor selectively twistable so as to selectively move said cam follower peg into selective operative engagement with a selected distal end wall of said arcuate slot, said modified tool holder adaptor in selective biased engagement with said biasing spring so as to maintain said cam follower peg in its operative use engagement with said arcuate slot.

3. In a rapid change drill holder assembly, the combination comprising:

a chuck-engaging adaptor holder having a longitudianlly extending chuck-engaging extension provided at one end thereof, said chuck-engaging adaptor holder having a tool holder adaptor receiving portion at the opposite end thereof, said tool holder adaptor receiving portion having a tool holder adaptor receiving bore longitudinally provided therein, said tool holder adaptor receiving bore provided with a tool holder adaptor engaging biasing spring at the inside terminal end thereof, said tool holder adaptor receiving bore provided with a cam follower peg extending radially inwardly from the inside wall thereof;

a tool holder adaptor for selective operative engagement with said chuck-engaging adaptor holder, said tool holder adaptor having an axially aligned tool receiving bore at one end thereof for selectively receiving a tool therein, said tool holder adaptor provided with a radially oriented tool-retaining set-screw for fixedly retaining a tool selectively positioned in said tool receiving bore, said tool holder adaptor having a peg-receiving T-slot in the outer surface at one end thereof, said peg receiving T-slot having a transverse arcuate portion, said T-slot adapted to operatively engage said cam follower peg upon selective insertion of said tool holder adaptor into said tool holder adaptor receiving bore of said chuck engaging adaptor holder, said tool holder adaptor selectively twistable so as to selectively move said transverse arcuate portion of said T-slot so that a selected distal end thereof moves into selective operative engagement with said cam follower peg, said tool holder adaptor in selective biased engagement with said biasing spring so as to maintain said peg in its operative use engagement with said arcuate portion of said T-slot.

4. In the rapid change drill holder of claim 3 wherein a further modified tool holder adaptor is provided for alternative selective engagement with said chuck-engaging adaptor holder, said modified tool holder adaptor having an axially aligned tool receiving bore at one end thereof for selectivley receiving a tool therein, said tool receiving bore having a tool retaining magnet provided at the inside terminal end thereof, said tool retaining magnet adapted to magnetically retain a tool positioned thereagainst within said tool receiving bore, said tool receiving bore provided with hexagonal internal longitudinally extending sides so as to matingly operatively engage a hexagonal sided tool selectively inserted within said tool receiving bore, said modified tool holder adaptor having a peg-receiving bore, said modified tool holder adaptor having a peg-receiving T-slot in the outer surface at the opposite end thereof, said peg receiving T-slot having transverse arcuate portion, said T-slot adapted to operatively engage said cam follower peg upon selective insertion of said tool holder adaptor into said tool holder adaptor receiving bore of said chuck-engaging adaptor holder, said cam follower peg being in alignment with said transverse arcuate portion of said T-slot when said tool holder is fully inserted into said tool holder adaptor receiving bore, said tool holder adaptor selectively twistable so as to selectively move said transverse arucate portion of said T-slot so as to bring a selected distal end thereof into selective operative engagement with said cam follower peg, said tool holder adaptor in selective biased engagement with said biasing spring so as to maintain said peg in its operative use engagement with said arcuate portion of said T-slot.

* * * * *